United States Patent
Hirata et al.

(10) Patent No.: US 9,186,619 B2
(45) Date of Patent: Nov. 17, 2015

(54) CO2 RECOVERY UNIT AND METHOD THEREFOR

(75) Inventors: Takuya Hirata, Hiroshima (JP); Keiji Fujikawa, Hiroshima (JP); Tatsuya Tsujiuchi, Hiroshima (JP); Tsuyoshi Oishi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1090 days.

(21) Appl. No.: 13/259,869

(22) PCT Filed: Dec. 21, 2009

(86) PCT No.: PCT/JP2009/071246
§ 371 (c)(1),
(2), (4) Date: Sep. 23, 2011

(87) PCT Pub. No.: WO2010/113364
PCT Pub. Date: Oct. 7, 2010

(65) Prior Publication Data
US 2012/0014861 A1    Jan. 19, 2012

(30) Foreign Application Priority Data
Apr. 3, 2009   (JP) ................................. 2009-091183

(51) Int. Cl.
*B01D 53/62* (2006.01)
*B01D 53/78* (2006.01)
(Continued)

(52) U.S. Cl.
CPC ........ *B01D 53/1475* (2013.01); *B01D 53/1425* (2013.01); *B01D 53/263* (2013.01);
(Continued)

(58) Field of Classification Search
None
See application file for complete search history.

(56) References Cited

U.S. PATENT DOCUMENTS

| 5,344,627 A | 9/1994 | Fujii et al. |
| 5,405,595 A | 4/1995 | Tomikawa et al. |
| 8,377,184 B2 * | 2/2013 | Fujikawa et al. ............... 96/234 |

FOREIGN PATENT DOCUMENTS

| EP | 1 944 268 A1 | 7/2008 |
| JP | 63-163771 A | 7/1988 |

(Continued)

OTHER PUBLICATIONS

S. Ariyapadi et al, "Study evaluates design of high-capacity CO2 injection plants", Oil and Gas Journal, Sep. 4, 2006, vol. 104, pp. 74-75, 78-84.

(Continued)

*Primary Examiner* — Stuart Hendrickson
*Assistant Examiner* — Daniel Berns
(74) *Attorney, Agent, or Firm* — Westerman, Hattori, Daniels & Adrian, LLP

(57) ABSTRACT

A $CO_2$ recovery unit 10A according to a first embodiment has a $CO_2$ absorber that removes $CO_2$ in flue gas by bringing the flue gas containing $CO_2$ into contact with a $CO_2$ absorbent 12, and a regenerator 15 that diffuses $CO_2$ in a rich solution 14 having absorbed $CO_2$ in the $CO_2$ absorber. The $CO_2$ recovery unit 10A includes a first compressor 29-1 to a fourth compressor 29-4 that compress $CO_2$ gas 16 discharged from the regenerator 15, a dehydrating column 33 that reduces moisture in the $CO_2$ gas 16 by bringing the $CO_2$ gas 16 into contact with a dehydrating agent 32, a combustion removal unit 41 that removes the dehydrating agent 32 mixed in the $CO_2$ gas 16 in the dehydrating column 33, and a heat exchanger 42 that performs heat exchange between the $CO_2$ gas 16 discharged from the third compressor 29-3 and the $CO_2$ gas 16 discharged from the dehydrating column 33.

16 Claims, 5 Drawing Sheets

(51) Int. Cl.
  *B01D 53/96* (2006.01)
  *B01D 53/18* (2006.01)
  *B01D 53/26* (2006.01)
  *B01D 50/00* (2006.01)
  *B01D 19/00* (2006.01)
  *F01N 3/08* (2006.01)
  *F23J 11/00* (2006.01)
  *B01J 10/00* (2006.01)
  *B01D 53/14* (2006.01)
  *E21B 43/16* (2006.01)
  *B01D 53/77* (2006.01)

(52) U.S. Cl.
  CPC ............... *E21B43/164* (2013.01); *B01D 53/77* (2013.01); *B01D 2251/21* (2013.01); *B01D 2251/70* (2013.01); *B01D 2257/504* (2013.01); *B01D 2258/0283* (2013.01); *Y02C 10/04* (2013.01); *Y02C 10/06* (2013.01)

(56) References Cited

FOREIGN PATENT DOCUMENTS

| | | |
|---|---|---|
| JP | 4-055681 A | 2/1992 |
| JP | 5-184868 A | 7/1993 |
| JP | 2008-062165 A | 3/2008 |

OTHER PUBLICATIONS

A. Bahadori et al., "New Equations Estimate Acid-Gas Solubility in TEG", Oil and Gas Journal, Feb. 2006, pp. 55-59.
Written Opinion of PCT/JP2009/071246, mailing date Feb. 16, 2010.
Extended European Search Report dated Sep. 26, 2012, issued in corresponding European Patent Application No. 09842715.6.
Japanese Decision of a Patent Grant dated Oct. 16, 2012, issued in corresponding Japanese Patent Application No. 2009-091183, (5 pages). With English Translation.
Notice of Allowance dated May 29, 2013, issued in corresponding Canadian Patent Application No. 2,756,036.
Russian Decision of a Patent Grant dated Dec. 10, 2012, issued in corresponding Russian Patent Application No. 2011140020.
Australian Notice of Acceptance dated Aug. 29, 2013, issued in corresponding Australian Patent Application No. 2009343524 (38 pages).
International Search Report of JP/PCT2009/071246, mailing date Feb. 16, 2010.

\* cited by examiner

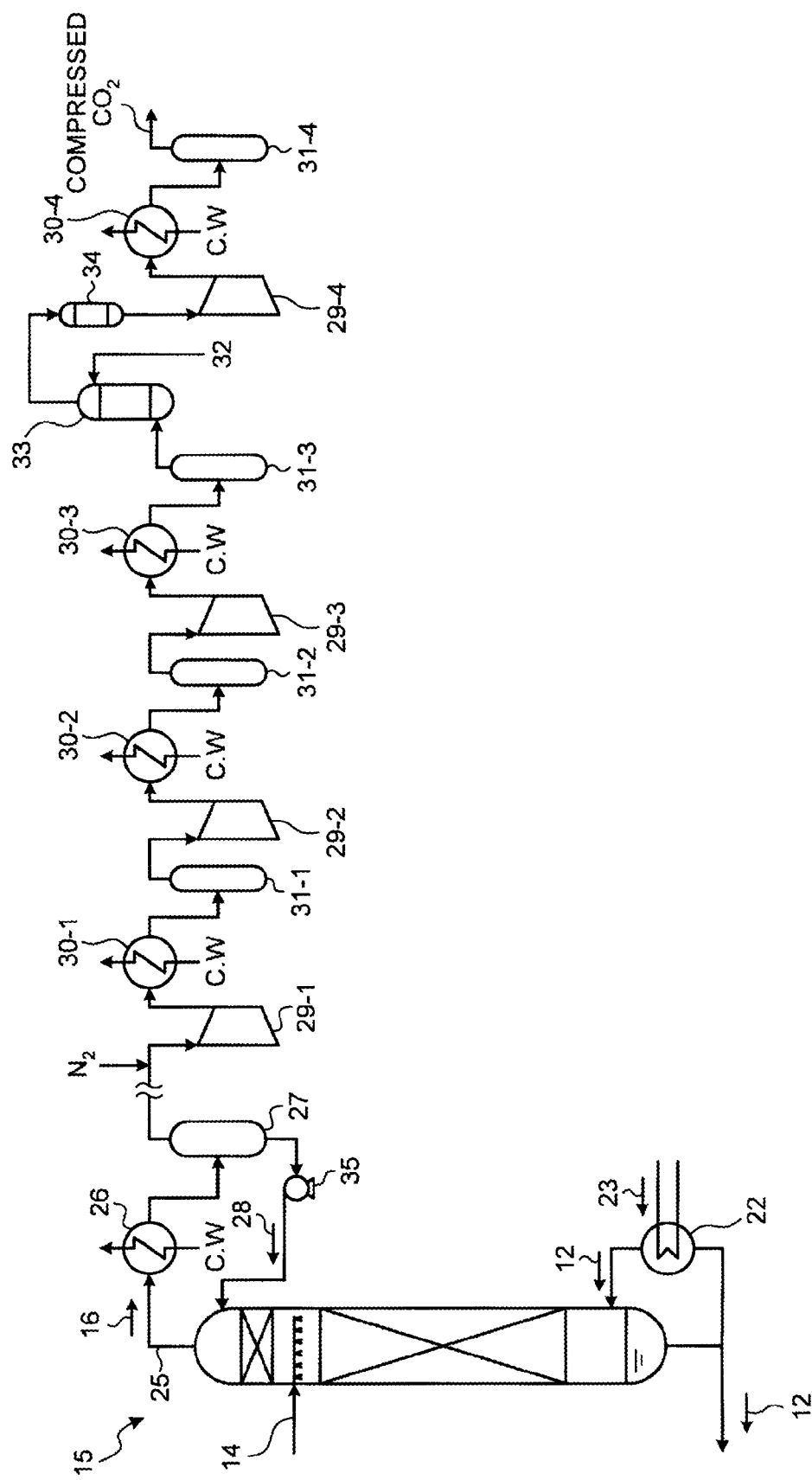

CO2 RECOVERY UNIT AND METHOD THEREFOR

TECHNICAL FIELD

The present invention relates to a $CO_2$ recovery unit and a $CO_2$ recovery method for absorbing $CO_2$ in flue gas into a $CO_2$ absorbent to remove the $CO_2$ in the flue gas and regenerates and reuses the $CO_2$ absorbent.

BACKGROUND ART

Recently, as one of the causes of global warming, a greenhouse effect due to $CO_2$ has been pointed out, and a measure against it becomes urgent internationally for protecting the global environment. Generation sources of $CO_2$ include all sorts of human activities that burn fossil fuel, and demands for reducing discharges thereof are increasing further. Accompanying this demand, a method of removing and recovering $CO_2$ in combustion discharge gas by bringing combustion discharge gas in a boiler into contact with an amine $CO_2$ absorbent (hereinafter, also "absorbent"), and a method of storing recovered $CO_2$ without discharging it to the air have been strenuously researched, with regard to power generation facilities such as a thermal power plant that uses a large amount of fossil fuel.

There has been disclosed a method in which, after $CO_2$ is removed by absorption from discharge gas by using an absorbent, $CO_2$ is diffused and recovered, and the absorbent is regenerated, circulated in a $CO_2$ absorber again, and reused (see, for example, Patent document 1).

FIG. 4 is a configuration example of a conventional $CO_2$ recovery unit. As shown in FIG. 4, a conventional $CO_2$ recovery unit 100 includes a $CO_2$ absorber 13 that removes $CO_2$ in flue gas 11 by bringing the flue gas 11 containing $CO_2$ discharged from industrial combustion facilities such as a boiler and a gas turbine into contact with a $CO_2$ absorbent 12 that absorbs $CO_2$, and a regenerator 15 that diffuses $CO_2$ from a $CO_2$ absorbent 14 having absorbed $CO_2$ (hereinafter, also "rich solution") to regenerate the $CO_2$ absorbent 12.

In the $CO_2$ recovery unit 100, $CO_2$ is diffused in the regenerator 15, and the regenerated $CO_2$ absorbent 12 (hereinafter, also "lean solution") is reused as the $CO_2$ absorbent in the $CO_2$ absorber 13. $CO_2$ gas 16 recovered in the regenerator 15 is compressed by a compressor, injected into an oilfield, and used for enhanced oil recovery (EOR), accumulated in a water-bearing layer as a measure against global warming, or used as a synthetic raw material of chemical products.

In FIG. 4, reference numeral 17 denotes flue gas in which $CO_2$ is removed in the $CO_2$ absorber 13, 18 denotes a rich solvent pump that feeds the rich solution 14 to the regenerator 15, 19 denotes rich/lean solvent heat exchanger that performs heat exchange between the rich solution 14 and the lean solution 12, 20 denotes a lean solvent pump that feeds the lean solution 12 to the $CO_2$ absorber 13, 21 denotes a lean solvent cooler that cools the lean solution 12, 22 denotes a regenerating heater, and 23 denotes water vapor.

FIG. 5 is an example of a process of injecting the $CO_2$ gas 16 recovered in the regenerator 15 into the ground. The pressure of the $CO_2$ gas 16 recovered in the regenerator 15 is raised at a compressing process 101, and transported to a well 103a at an accumulation point by a transport unit 102 such as a pipeline or a ship. In the well 103b at the accumulation point, for example, gas (hereinafter, also "recycle gas") accompanying crude oil is mixed with gas 105 refined in a recycle-gas purification facility 104, and injected into the ground 107 at an injecting process 106. At this time, if hydrogen sulfide ($H_2S$) is contained in recycle gas 105, as shown in equation below, oxygen ($O_2$) contained in the $CO_2$ gas 16 reacts with $H_2S$ to precipitate solid sulfur (S), and operation of a plant can be affected.

$$2H_2S+O_2=2S+2H_2O \qquad (1)$$

Further, when moisture remaining in the $CO_2$ gas 16 is condensed due to compression, carbonic acid corrosion may be promoted due to coexistence of oxygen. As another method of preventing precipitation of sulfur, a method of supplying $N_2$ gas at the time of start-up and shut-down of a compressor to remove sulfur contents (S contents) and $O_2$ remaining in the compressor and piping has been adopted (see, for example, Nonpatent literature 1).

Further, because carbonic acid corrosion can be caused when moisture remaining in the $CO_2$ gas 16 is condensed due to compression, there has been adopted a method such that $CO_2$ gas is brought into contact with a dehydrating agent such as a molecular sieve, diethylene glycol (DEG), or triethylene glycol (TEG) to reduce moisture contained in $CO_2$ gas, thereby preventing carbonic acid corrosion.

FIG. 6 depicts a process of compressing $CO_2$ gas recovered in a regenerator. As shown in FIG. 6, the $CO_2$ gas 16 accompanied with water vapor released from the rich solution 14 and semi-lean solution in the regenerator is derived from a top part of the regenerator 15 via a gas discharge line 25, water vapor is condensed by a condenser 26, and water 28 is separated in a separation drum 27. The $CO_2$ gas 16 accompanied with water vapor is compressed by a first compressor 29-1 to a fourth compressor 29-4, while gradually raising the pressure, and recovered as compressed $CO_2$.

On a downstream side of each of the first to fourth compressors 29-1 to 29-4, a first cooler 30-1 to a fourth cooler 30-4 and a first separator 31-1 to a fourth separator 31-4 are respectively provided to reduce fluid generated by compressing the $CO_2$ gas 16. A dehydrating column 33 is provided between the third compressor 29-3 and the fourth compressor 29-4, so that the $CO_2$ gas 16 is brought into contact with a dehydrating agent 32 (molecular sieve or DEG or TEG) to reduce moisture in the $CO_2$ gas 16, and is dehydrated.

In FIG. 6, reference numeral 34 denotes a gas-liquid separator, and 35 denotes a condensed-water circulating pump that supplies the water 28 separated in the separation drum 27 to an upper part of the regenerator 15.

Further, there has been adopted an apparatus in which a mist catcher is provided in a dehydrating column, so that a dehydrating agent (such as DEG or TEG) supplied to the dehydrating column is captured so as not to be fed to the downstream side of the dehydrating column accompanying $CO_2$ gas (see, for example, Nonpatent literature 2).

PRIOR ART DOCUMENTS

Patent Documents

Patent document 1: Japanese Patent Application Laid-open No. 2008-62165

NONPATENT LITERATURE

Nonpatent literature 1: "Oil & Gas Journal", published on Sep. 4, 2006, p74-84

Nonpatent literature 2: "Oil & Gas Journal", published on Feb. 27, 2006, p55-59

DISCLOSURE OF INVENTION

Problem to be Solved by the Invention

However, even when the mist catcher is provided in the dehydrating column 33, if the dehydrating agent 32 that has not been captured by the mist catcher is fed to a compressor or the like on the downstream side while being mixed in the $CO_2$ gas 16, precipitation and deposition occur in the compressor and piping on the downstream side, thereby causing a problem that the inside of the compressor and piping on the downstream side of the dehydrating column 33 can be damaged.

There is also a problem that clogging can occur in the apparatus and piping due to $O_2$ remaining in the $CO_2$ gas 16.

Further, when the $CO_2$ gas 16 is used as a synthetic raw material of chemical products, coloration can occur in the chemical products.

The present invention has been achieved to solve the above problems, and an object of the present invention is to provide a $CO_2$ recovery unit that prevents a dehydrating agent supplied to a dehydrating column is fed to a compressor and the like on the downstream side of a dehydrating column, and a method therefor.

MEANS FOR SOLVING PROBLEM

According to an aspect of the present invention, a $CO_2$ recovery unit including a $CO_2$ absorber that brings flue gas containing $CO_2$ into contact with a $CO_2$ absorbent and removes $CO_2$ in the flue gas, and a regenerator that diffuses $CO_2$ in a rich solution having absorbed $CO_2$ in the $CO_2$ absorber, to reuse in the $CO_2$ absorber a lean solution which is obtained by removing $CO_2$ from the rich solution in the regenerator, includes: at least two compressors that compress $CO_2$ gas discharged from the regenerator; a dehydrating column that is provided between any two of the compressors and reduce moisture in the $CO_2$ gas by bringing the $CO_2$ gas into contact with a dehydrating agent; a combustion removal unit that removes the dehydrating agent mixed in $CO_2$ gas in the dehydrating column; and a heat exchanger that is provided between the dehydrating column and the combustion removal unit and performs heat exchange between $CO_2$ gas discharged from any one of the compressors and $CO_2$ gas discharged from the dehydrating column.

Advantageously, in the $CO_2$ recovery unit, the combustion removal unit is provided between the dehydrating column and a gas-liquid separator provided on a downstream side of the dehydrating column.

Advantageously, in the $CO_2$ recovery unit, the heat exchanger is provided in the combustion removal unit.

Advantageously, in the $CO_2$ recovery unit, the combustion removal unit includes a combustion catalyst for removing a dehydrating agent in the $CO_2$ gas.

Advantageously, in the $CO_2$ recovery unit, the combustion removal unit includes a combustion catalyst for removing a dehydrating agent in the $CO_2$ gas, in which the heat exchanger and the combustion catalyst are arranged in this order from an inlet side of $CO_2$ gas into the combustion removal unit toward an outlet side thereof.

Advantageously, in the $CO_2$ recovery unit, the combustion catalyst is a Pd metal catalyst or a Pt metal catalyst.

Advantageously, the $CO_2$ recovery unit includes a branch passage for extracting $CO_2$ gas discharged from the combustion removal unit and merging the $CO_2$ gas with $CO_2$ gas discharged from the dehydrating column.

Advantageously, the $CO_2$ recovery unit includes a hydrogen-gas supply unit that supplies hydrogen rich gas into the combustion removal unit.

Advantageously, in the $CO_2$ recovery unit, the hydrogen rich gas is hydrogen produced by a hydrogen producing device, which uses fossil fuel as a raw material and has a reforming process and a CO shifting process.

Advantageously, in the $CO_2$ recovery unit, the hydrogen rich gas contains CO as well as hydrogen.

According to another aspect of the present invention, a $CO_2$ recovery method in which flue gas containing $CO_2$ is brought into contact with a $CO_2$ absorbent in a $CO_2$ absorber to remove $CO_2$ in the flue gas, $CO_2$ in a rich solution having absorbed $CO_2$ is removed in a regenerator, and a regenerated lean solution is reused in the $CO_2$ absorber, and $CO_2$ gas discharged from the regenerator is recovered, includes: compressing the $CO_2$ gas recovered from the regenerator by using at least two compressors; reducing moisture in the $CO_2$ gas by bringing the $CO_2$ gas into contact with the dehydrating agent between any two of the compressors; heat-exchanging $CO_2$ gas brought into contact with the dehydrating agent with $CO_2$ gas discharged from any one of the compressors; and removing the dehydrating agent mixed in the $CO_2$ gas by combustion and removing $O_2$ to recover $CO_2$ gas.

Advantageously, in the $CO_2$ recovery method, the dehydrating agent mixed in the $CO_2$ gas is combusted and removed after the $CO_2$ gas is brought into contact with the dehydrating agent and before separating moisture in the $CO_2$ gas.

Advantageously, in the $CO_2$ recovery method, hydrogen rich gas is supplied at a time of combusting and removing the dehydrating agent mixed in the $CO_2$ gas.

Advantageously, in the $CO_2$ recovery method, hydrogen produced by a hydrogen producing device, which uses fossil fuel as a raw material and has a reforming process and a CO shifting process, is used as the hydrogen rich gas.

Advantageously, in the $CO_2$ recovery method, a gas containing CO as well as hydrogen is used as the hydrogen rich gas.

According to still another aspect of the present invention, in a $CO_2$ recovery method of using the $CO_2$ recovery unit, in a process of compressing the $CO_2$ gas recovered from the regenerator, after moisture in the $CO_2$ gas is reduced by bringing the $CO_2$ gas into contact with the dehydrating agent, $CO_2$ gas after removal of moisture is heat-exchanged with $CO_2$ gas discharged from any one of compressors, and the dehydrating agent mixed in the $CO_2$ gas is removed by combustion and $O_2$ is removed, to recover $CO_2$ gas.

EFFECT OF THE INVENTION

According to the $CO_2$ recovery unit of the present invention, because a combustion removal unit that removes the dehydrating agent mixed in $CO_2$ gas is provided on the downstream side of the dehydrating column, the dehydrating agent mixed in $CO_2$ gas discharged from the dehydrating column can be burned and removed, and $O_2$ can be burned and removed. Therefore, damages in the compressor and piping provided on the downstream side of the dehydrating column can be prevented, and the problem of clogging in the apparatus and piping caused by oxygen ($O_2$) remaining in $CO_2$ gas and coloration of chemical products using $CO_2$ gas as a raw material can be suppressed.

BRIEF DESCRIPTION OF DRAWINGS

FIG. 6 depicts a process of compressing $CO_2$ gas recovered in a regenerator.

BEST MODE(S) FOR CARRYING OUT THE INVENTION

Exemplary embodiments of the present invention are explained below in detail with reference to the accompanying drawings. The present invention is not limited to these embodiments. In addition, constituent elements in the embodiments include those that can be easily assumed by persons skilled in the art or that are substantially equivalent.
First Embodiment A $CO_2$ recovery unit according to a first embodiment of the present invention is explained with reference to FIG. 1.

Figure 1:
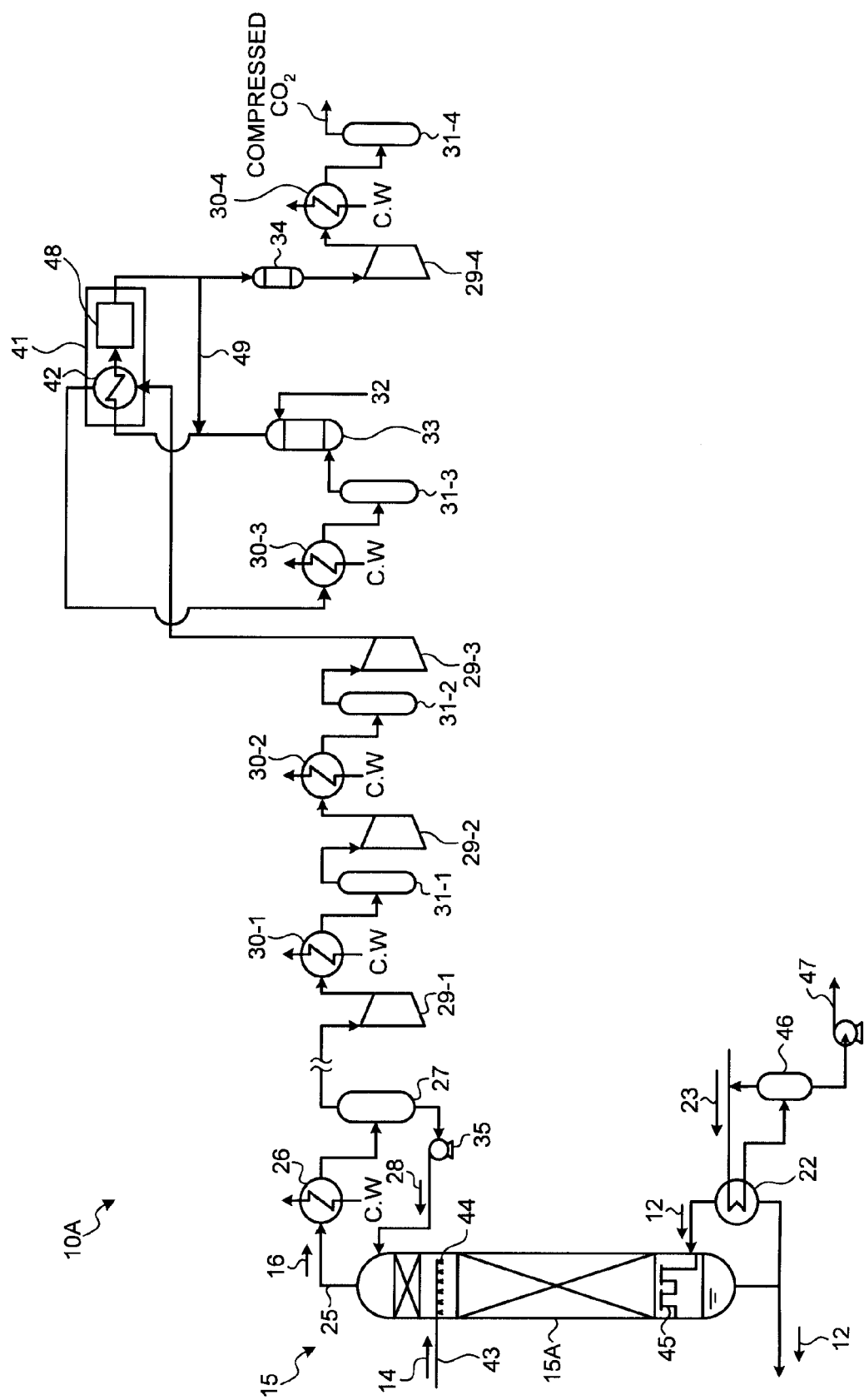
FIG. 1 is a schematic diagram of a configuration of a $CO_2$ recovery unit according to a first embodiment of the present invention.

FIG. 1 is a schematic diagram of a configuration of the $CO_2$ recovery unit according to the first embodiment of the present invention.

Figure 4:
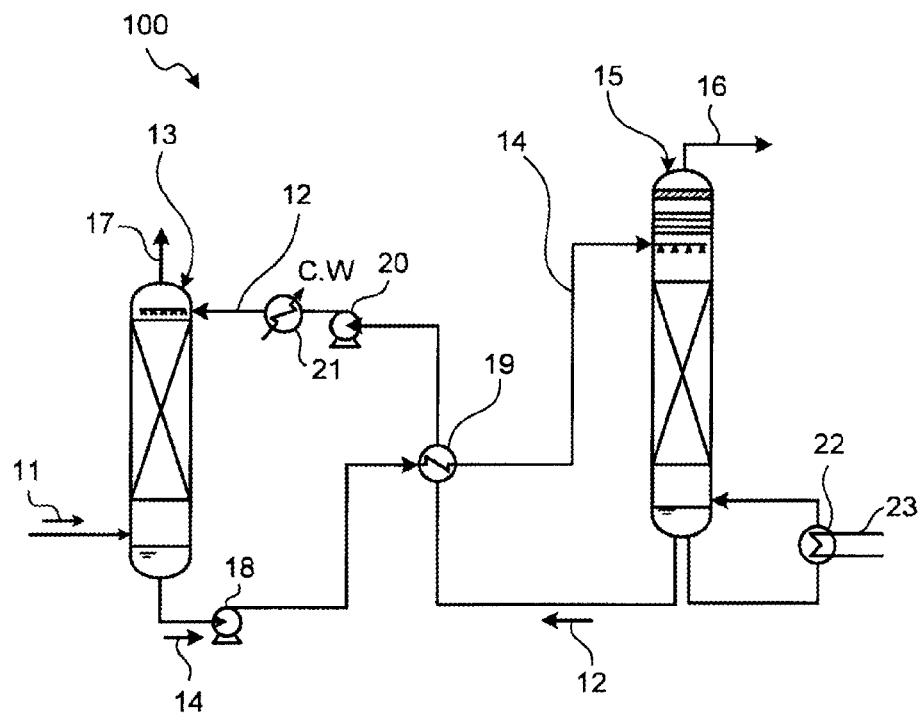
FIG. 4 is a configuration example of a conventional $CO_2$ recovery unit.
Figure 5:
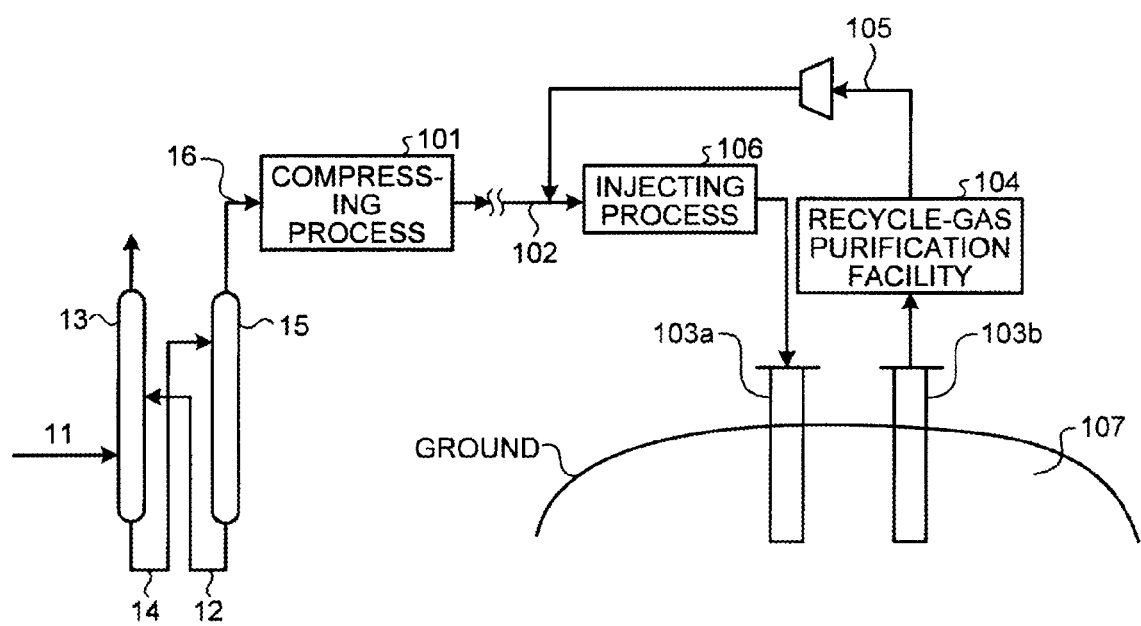
FIG. 5 is an example of a process of injecting $CO_2$ gas recovered in a regenerator into the ground.

Among constituent elements shown in FIG. 1, elements identical to those shown in FIGS. 4 to 6 described above are denoted by like reference numerals and redundant explanations thereof will be omitted.

As in the $CO_2$ recovery unit shown in FIGS. 4 and 5, a $CO_2$ recovery unit 10A according to the present embodiment includes a $CO_2$ absorption system that absorbs $CO_2$ by a $CO_2$ absorber, a $CO_2$-recovery and $CO_2$-absorbent regeneration system that recovers $CO_2$ and regenerates a $CO_2$ absorbent by a regenerator, and a $CO_2$ compression system that compresses recovered $CO_2$ for injecting $CO_2$ into the ground or an oilfield as shown in FIGS. 5 and 6. Because a $CO_2$ absorption system that absorbs $CO_2$ by the $CO_2$ absorber 13 is the same as the $CO_2$ recovery unit shown in FIGS. 4 and 5, explanations thereof will be omitted.

As shown in FIG. 1, the $CO_2$ recovery unit 10A according to the first embodiment of the present invention includes a $CO_2$ absorber that brings flue gas containing $CO_2$ into contact with the $CO_2$ absorbent (hereinafter, "absorbent") 12 and removes $CO_2$ in the flue gas, and the regenerator 15 that diffuses $CO_2$ in the $CO_2$ absorbent (hereinafter, "rich solution") 14 having absorbed $CO_2$ in the $CO_2$ absorber, to reuse the regenerated $CO_2$ absorbent (hereinafter, "lean solution") 12, which is obtained by removing $CO_2$ in the rich solution in the regenerator 15, in the $CO_2$ absorber. The $CO_2$ recovery unit 10A includes the first to fourth compressors 29-1 to 29-4 that compress the $CO_2$ gas 16 discharged from the regenerator 15, the dehydrating column 33 provided between the third compressor 29-3 and the fourth compressor 29-4, to reduce moisture in the $CO_2$ gas 16 by bringing the $CO_2$ gas 16 into contact with the dehydrating agent 32, a combustion removal unit 41 that removes the dehydrating agent 32 mixed in the $CO_2$ gas 16 in the dehydrating column 33, and a heat exchanger 42 provided in the combustion removal unit to perform heat exchange between the $CO_2$ gas 16 discharged from the third compressor 29-3 and the $CO_2$ gas 16 discharged from the dehydrating column 33.

The rich solution 14 is supplied from the $CO_2$ absorber to the regenerator 15 from the top part thereof via a rich-solution supply pipe 43. The rich solution 14 discharged from the upper part of the regenerator 15 to the inside of the regenerator 15 by a nozzle 44 releases the most part of $CO_2$ via an endothermic reaction. The $CO_2$ absorbent 12 that has discharged a part of or the most part of $CO_2$ in the regenerator 15 is referred to as semi-lean solution. The semi-lean solution becomes the $CO_2$ absorbent (the lean solution) 12 in which almost all of $CO_2$ has been removed when the semi-lean solution reaches a lower part of the regenerator 15. The lean solution 12 is heated by the water vapor 23 in the regenerating heater 22, and a part of the lean solution 12 evaporates to supply water vapor into the regenerator 15.

In FIG. 1, reference character 15A denotes a packed bed arranged in the regenerator 15, reference numeral 45 denotes a chimney tray, 46 denotes a separation drum that recovers the water vapor 23 heat-exchanged with the lean solution 12, and 47 denotes water vapor and condensed water separated in the separation drum 46.

The $CO_2$ gas 16 accompanied with water vapor, which is discharged from the rich solution 14 and semi-lean solution in the regenerator, is derived via the gas discharge line 25 from the top part of the regenerator 15, water vapor is condensed by the condenser 26, the water 28 is separated in the separation drum 27, and the $CO_2$ gas 16 is released to the outside of the system and recovered separately. The water 28 separated in the separation drum 27 is supplied to the upper part of the regenerator 15 by the condensed-water circulation pump 35.

On the other hand, the regenerated $CO_2$ absorbent (the lean solution) 12 is discharged from the bottom of the regenerator 15, cooled by heat exchange with the rich solution 14, and after the pressure is raised, the $CO_2$ absorbent 12 is further cooled and supplied to the $CO_2$ absorber.

The $CO_2$ gas 16 accompanied with water vapor recovered from the regenerator 15 is compressed by the first to fourth compressors 29-1 to 29-4. Specifically, the $CO_2$ gas 16 is compressed by the first compressor 29-1 and cooled by the first cooler 30-1, moisture in the $CO_2$ gas 16 is separated in the first separator 31-1, and provided to the second compressor 29-2. The same process is performed in the second to fourth compressors 29-2 to 29-4, so that the pressure of the $CO_2$ gas 16 is gradually raised and compressed.

The dehydrating column 33 into which the dehydrating agent 32 is supplied is provided between the third compressor 29-3 and the fourth compressor 29-4. The dehydrating agent 32 is supplied into the dehydrating column 33, and the $CO_2$ gas 16 is brought into contact with the dehydrating agent 32 to reduce moisture in the $CO_2$ gas 16 and to dehydrate the $CO_2$ gas 16. Accordingly, because moisture contained in the $CO_2$ gas 16 can be removed, carbonic acid corrosion caused by moisture condensed due to compression of $CO_2$ gas can be removed.

In the $CO_2$ recovery unit 10A according to the present embodiment, the combustion removal unit 41 is provided between the dehydrating column 33 and the gas-liquid separator 34 provided on the downstream side of the dehydrating column 33. The combustion removal unit 41 removes the dehydrating agent 32 mixed in the $CO_2$ gas 16 in the dehydrating column 33, and removes $O_2$ in the $CO_2$ gas 16.

In the $CO_2$ recovery unit 10A according to the present embodiment, the heat exchanger 42 is provided in the combustion removal unit 41. The combustion removal unit 41 includes a combustion catalyst 48 that removes the dehydrating agent 32 in the $CO_2$ gas 16.

The heat exchanger 42 and the combustion catalyst 48 are arranged in this order from an inlet side of the $CO_2$ gas 16 into the combustion removal unit 41 toward an outlet side thereof. The $CO_2$ gas 16 discharged from the dehydrating column 33 is indirectly heat-exchanged with the $CO_2$ gas 16 discharged from the third compressor 29-3 in the heat exchanger 42. The $CO_2$ gas 16 discharged from the third compressor 29-3 has a temperature as high as about 150° C., and the $CO_2$ gas 16 discharged from the dehydrating column 33 has been cooled to a low temperature in the third cooler 30-3 and the dehydrating column 33. Therefore, the $CO_2$ gas 16 discharged from the dehydrating column 33 is indirectly heat-exchanged with the $CO_2$ gas 16 discharged from the third compressor 29-3 in the heat exchanger 42 to be heated to a high temperature, thereby enabling to increase reactivity between the dehydrating agent 32 mixed in the $CO_2$ gas 16 and $O_2$ in the $CO_2$ gas 16 in the combustion catalyst 48.

For example, when TEG is used as the dehydrating agent, the $CO_2$ gas 16 heated to a high temperature in the heat exchanger 42 is fed to the combustion catalyst 48 to cause reaction as shown in the following equation between the dehydrating agent 32 mixed in the $CO_2$ gas 16 in the dehydrating column 33 and a small amount of $O_2$ in the $CO_2$ gas 16, thereby enabling to convert the dehydrating agent 32 to $CO_2$ and $H_2O$ and remove the dehydrating agent 32.

$$C_6H_{14}O_4 + 15/2 O_2 \rightarrow 6 CO_2 + 7 H_2O \quad (2)$$

Because $O_2$ in the $CO_2$ gas 16 reacts with the dehydrating agent 32 in the combustion catalyst 48, problems such as precipitation of S due to reaction of $O_2$ in the $CO_2$ gas 16 with $H_2S$ in the $CO_2$ gas 16, and coloration of chemical products using $CO_2$ as a raw material can be suppressed.

For example, oxygen concentration in the $CO_2$ gas 16 discharged from the dehydrating column 33 and fed to the combustion removal unit 41 is about several hundreds of ppm, and concentration of the dehydrating agent mixed in the $CO_2$ gas 16 in the dehydrating column 33 is from about several to several tens of ppm. It is assumed here that a gas temperature of the $CO_2$ gas 16 fed from the dehydrating column 33 to the combustion removal unit 41 is about 50° C. At this time, the gas temperature of the $CO_2$ gas 16 discharged from the third compressor 29-3 is about 150° C. By performing indirect heat exchange with the $CO_2$ gas 16 having the temperature of about 150° C., the reaction temperature in the combustion removal unit 41 is increased to increase reactivity between the dehydrating agent 32 and $O_2$, thereby enabling to reduce the dehydrating agent 32 in the $CO_2$ gas 16 to be fed to the combustion removal unit 41.

The catalyst to be used as the combustion catalyst 48 is not particularly limited, and one that can remove the dehydrating agent mixed in the $CO_2$ gas 16 and $O_2$ can be used and, for example, a Pd metal catalyst or a Pt metal catalyst can be preferably used.

In the $CO_2$ recovery unit 10A according to the present embodiment, the combustion catalyst 48 is provided in the combustion removal unit 41; however, the present invention is not limited thereto. As the configuration of the combustion removal unit 41, one that can remove the dehydrating agent mixed in the $CO_2$ gas 16 and $O_2$ can be used. For example, the combustion removal unit 41 can be a cartridge type in which the combustion removal unit 41 including the combustion catalyst 48 can be incorporated in the piping through which the $CO_2$ gas 16 to be compressed is fed. A static mixer or a honeycomb structure in which the combustion catalyst 48 is applied on the surface of a body of the combustion removal unit 41 can be used. The dehydrating agent and $O_2$ in the $CO_2$ gas 16 can be efficiently removed by using the combustion removal unit 41 having such a configuration.

The $CO_2$ recovery unit 10A according to the present embodiment has a branch passage 49 for extracting the $CO_2$ gas 16 discharged from the combustion removal unit 41, and merging the $CO_2$ gas 16 with the $CO_2$ gas 16 discharged from the dehydrating column 33. The $CO_2$ gas 16 discharged from the combustion removal unit 41 is fed to the gas-liquid separator 34 to reduce moisture in the $CO_2$ gas 16. However, when the dehydrating agent 32 mixed in the $CO_2$ gas 16 has not been removed completely by the combustion removal unit 41, the $CO_2$ gas 16 discharged from the combustion removal unit 41 can be extracted into the branch passage 49 to merge the $CO_2$ gas 16 with the $CO_2$ gas 16 discharged from the dehydrating column 33, and the dehydrating agent 32 in the $CO_2$ gas 16 can be removed again in the combustion removal unit 41.

Also when $O_2$ in the $CO_2$ gas 16 has not been completely removed, the $CO_2$ gas 16 discharged from the combustion removal unit 41 can be extracted into the branch passage 49 to merge the $CO_2$ gas 16 with the $CO_2$ gas 16 discharged from the dehydrating column 33, and $O_2$ in the $CO_2$ gas 16 can be removed again in the combustion removal unit 41 in the same manner.

Concentration of the dehydrating agent mixed in the $CO_2$ gas 16 in the dehydrating column 33 is monitored by providing a sensor that obtains the concentration of the dehydrating agent in the $CO_2$ gas 16 discharged from the dehydrating column 33 on the downstream side of the combustion removal unit 41.

Figure 2:
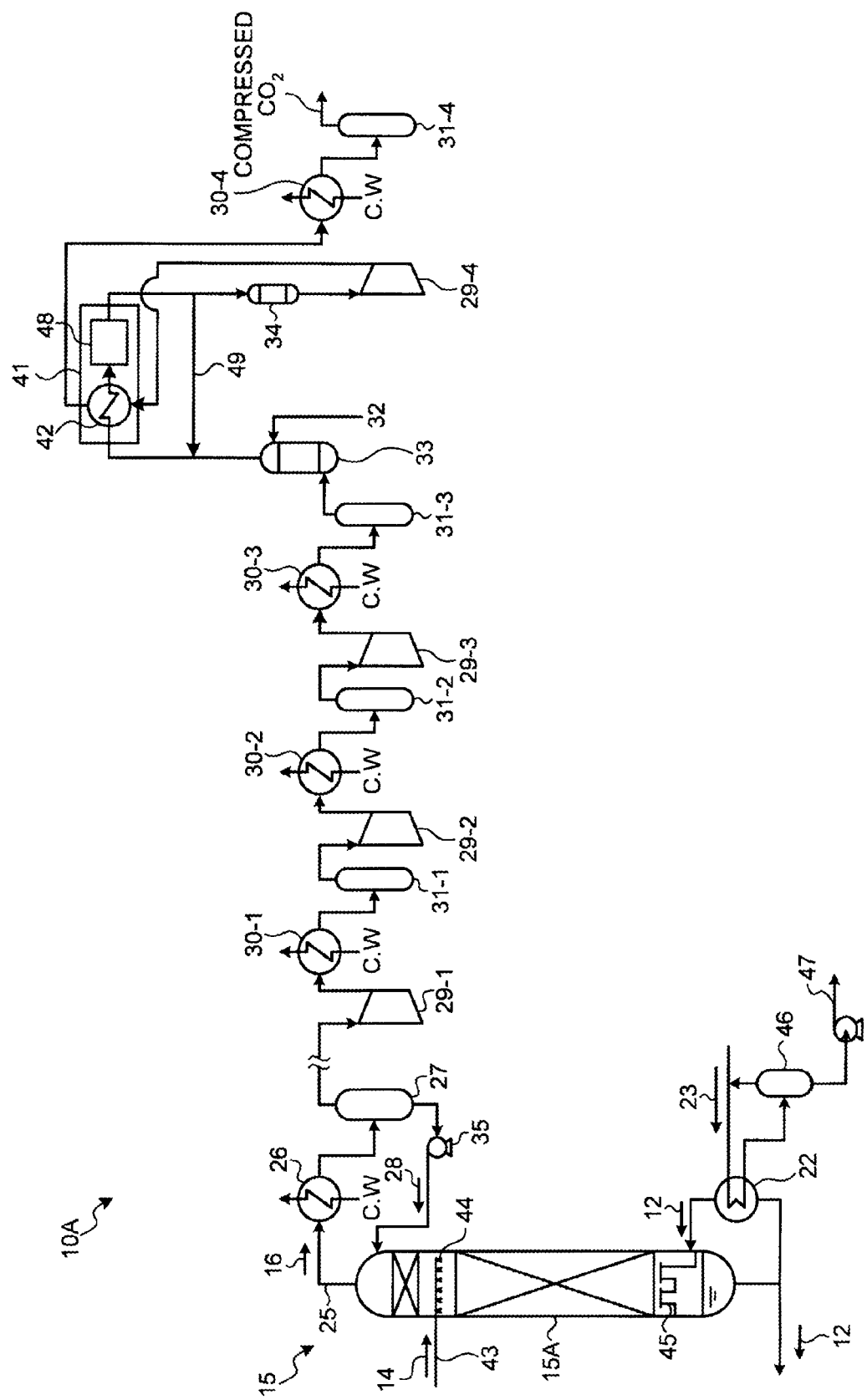
FIG. 2 is a schematic diagram of another configuration of the $CO_2$ recovery unit according to the first embodiment of the present invention.

In the present embodiment, the $CO_2$ gas 16 fed from the dehydrating column 33 to the combustion removal unit 41 is heat-exchanged with the $CO_2$ gas 16 discharged from the third compressor 29-3 in the heat exchanger 42. However, the $CO_2$ gas 16 used for heat exchange with the $CO_2$ gas 16 fed from the dehydrating column 33 to the combustion removal unit 41 in the heat exchanger 42 is not limited to the $CO_2$ gas 16 discharged from the third compressor 29-3. For example, as shown in FIG. 2, the $CO_2$ gas 16 fed from the dehydrating column 33 to the combustion removal unit 41 can be heat-exchanged with the $CO_2$ gas 16 discharged from the fourth compressor 29-4 in the heat exchanger 42. In the fourth compressor 29-4, because the $CO_2$ gas 16 is compressed to higher pressure than in the third compressor 29-3, the gas temperature of the $CO_2$ gas 16 discharged from the fourth compressor 29-3 is higher than that of the $CO_2$ gas 16 discharged from the third compressor 29-3. Therefore, the gas temperature of the $CO_2$ gas 16 discharged from the dehydrating column 33 can be increased more efficiently in the case that the $CO_2$ gas 16 discharged from the dehydrating column 33 is heat-exchanged with the $CO_2$ gas 16 discharged from the fourth compressor 29-4.

The $CO_2$ gas 16 discharged from any one of the first compressor 29-1 and the second compressor 29-2 can be used for heat exchange with the $CO_2$ gas 16 discharged from the dehydrating column 33 in the heat exchanger 42.

Four compressors are installed in the $CO_2$ recovery unit 10A according to the present embodiment; however, the number of installation of compressors can be appropriately changed according to the compression rate of the $CO_2$ gas 16.

In the $CO_2$ recovery unit 10A according to the present embodiment, the dehydrating column 33 is provided between the third compressor 29-3 and the fourth compressor 29-4. However, the present invention is not limited thereto, and the dehydrating column 33 can be provided between the first compressor 29-1 and the second compressor 29-2, between the second compressor 29-2 and the third compressor 29-3, or between any two compressors according to the number of installation of compressors.

In the $CO_2$ recovery unit 10A according to the present embodiment, further, the heat exchanger 42 is provided in the combustion removal unit 41. However, the present invention is not limited thereto, and the $CO_2$ gas 16 fed from the dehydrating column 33 to the combustion removal unit 41 only needs to be heat-exchanged and heated to a high temperature before being fed to the combustion catalyst 48. For example, the heat exchanger 42 can be provided between the dehydrating column 33 and the combustion removal unit 41 and outside of the combustion removal unit 41.

Cooling water C.W is used here as a low-temperature medium for heat exchange with the $CO_2$ gas 16 in the first to fourth coolers 30-1 to 30-4; however, the medium is not limited to the cooling water C.W, and tap water or industrial liquid waste can be used so long as it has a lower temperature than that of the $CO_2$ gas 16.

In the $CO_2$ recovery unit 10A according to the present embodiment, the combustion removal unit 41 is provided between the dehydrating column 33 and the gas-liquid separator 34, and the combustion removal unit 41 includes the heat exchanger 42 that heats the $CO_2$ gas 16 discharged from the dehydrating column 33 and the combustion catalyst 48 that removes the dehydrating agent 32 in the $CO_2$ gas 16, with the heat exchanger 42 and the combustion catalyst 48 being arranged in this order from the inlet side into the combustion removal unit 41 toward the outlet side of the $CO_2$ gas 16. Accordingly, the heat exchanger 42 heats the $CO_2$ gas 16 fed from the dehydrating column 33 to the combustion removal unit 41 to a high temperature, and the combustion catalyst 48 causes the dehydrating agent 32 mixed in the $CO_2$ gas 16 in the dehydrating column 33 to react with $O_2$ in the $CO_2$ gas 16, thereby enabling to remove the dehydrating agent 32 and $O_2$ due to combustion reaction. Therefore, it can be prevented that the dehydrating agent 32 mixed in the $CO_2$ gas 16 in the dehydrating column 33 is mixed in the compressor arranged on the downstream side of the dehydrating column 33, such as the fourth compressor 29-4.

Accordingly, damages in the compressor and piping provided on the downstream side of the dehydrating column due to precipitation and deposition of the dehydrating agent can be prevented, and problems of clogging in the apparatus and piping caused by $H_2S$ and $H_2O$ coexisting with $O_2$ remaining in $CO_2$ gas and coloration of the chemical products can be suppressed.

The $CO_2$ absorbent that can be used in the present invention is not particularly limited, and hindered amines having alkanolamine and an alcoholic hydroxyl group can be exemplified. As such alkanolamine, monoethanolamine, diethanolamine, triethanolamine, methyldiethanolamine, diisopropanolamine, diglycolamine, and the like can be exemplified; however, generally, monoethanolamine (MEA) is preferably used. As hindered amines having the alcoholic hydroxyl group, 2-amino-2-methyl-1-propanol (AMP), 2-(ethylamino)-ethanol (EAE), 2-(methylamino)-ethanol (MAE), and the like can be exemplified.

The type of the heat exchanger to be used in the present embodiment is not particularly limited, and for example, a well-known heat exchanger such as a plate heat exchanger or a shell and tube heat exchanger can be used.

Second Embodiment

Figure 3:
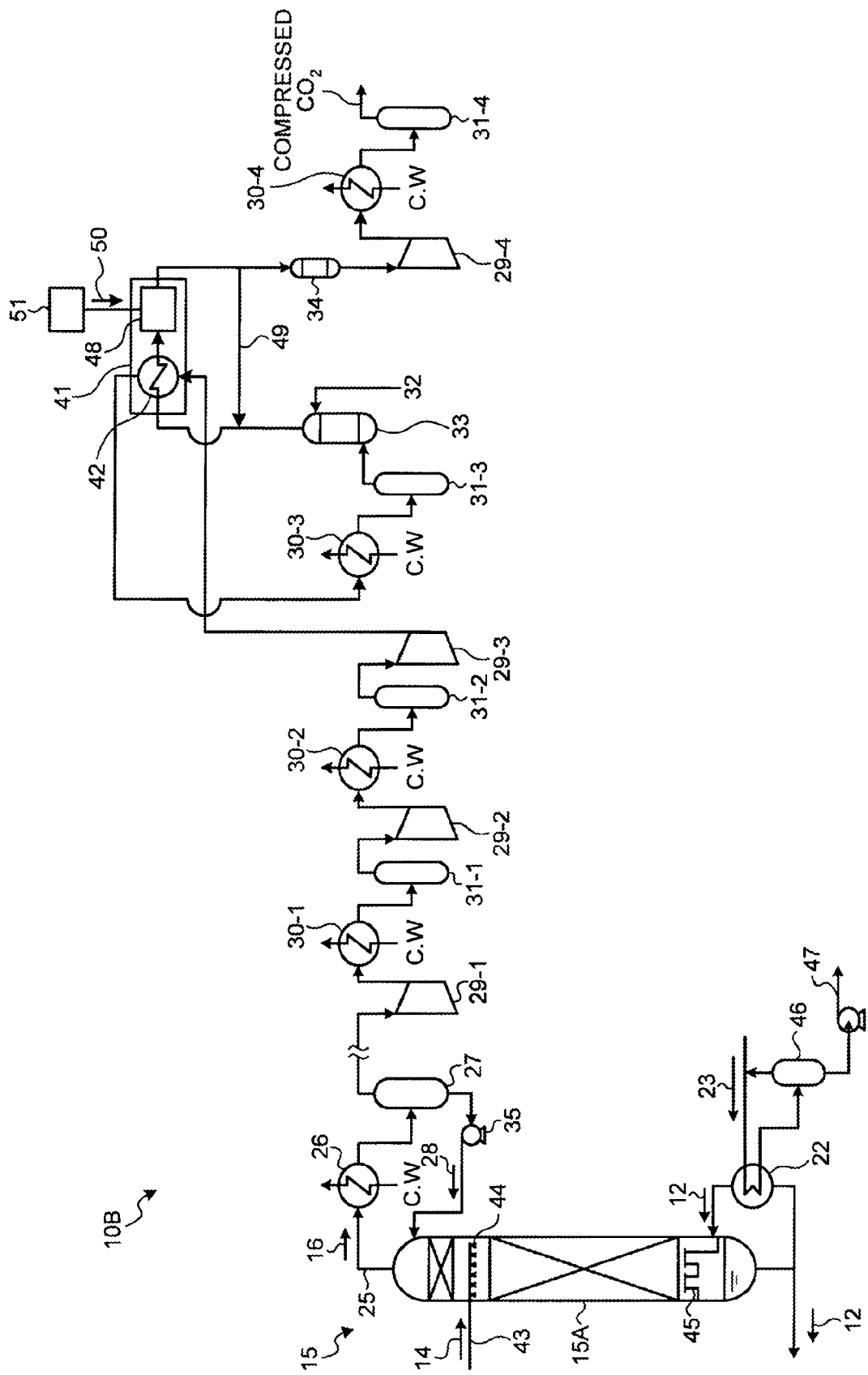
FIG. 3 is a schematic diagram of a $CO_2$ recovery unit according to a second embodiment of the present invention.

FIG. 3 is a schematic diagram of the $CO_2$ recovery unit according to a second embodiment of the present invention. The $CO_2$ recovery unit according to the present embodiment is explained with reference to FIG. 3. Members redundant with those in the configuration of the $CO_2$ recovery unit according to the first embodiment are denoted by like reference numerals and explanations thereof will be omitted.

In a $CO_2$ recovery unit 10B according to the present embodiment, the combustion removal unit 41 includes a hydrogen ($H_2$) gas supply unit 51 that supplies hydrogen ($H_2$) rich gas 50 into the combustion removal unit 41. $O_2$ in the $CO_2$ gas 16 supplied to the combustion removal unit 41 reacts with the $H_2$ rich gas 50 supplied into the combustion removal unit 41 by the combustion catalyst 48, thereby enabling to facilitate removal of $O_2$ in the $CO_2$ gas 16.

$O_2$ in the $CO_2$ gas 16 reacts with the dehydrating agent 32 mixed in the $CO_2$ gas 16 in the dehydrating column 33 by the combustion catalyst 48, thereby enabling to remove the dehydrating agent 32 and $O_2$ in the $CO_2$ gas 16, and $O_2$ in the $CO_2$ gas 16 unreacted with the dehydrating agent 32 reacts with the $H_2$ rich gas 50 supplied into the combustion removal unit 41, and $O_2$ in the $CO_2$ gas 16 can be combusted and removed.

Accordingly, by supplying the $H_2$ rich gas 50 into the combustion removal unit 41, $O_2$ in the $CO_2$ gas 16 supplied into the combustion removal unit 41 can be reacted with $H_2$ and combusted by the combustion catalyst 48, thereby enabling to facilitate removal of $O_2$ in the $CO_2$ gas 16.

The $H_2$ rich gas 50 only needs to be gas containing a large content of $H_2$ as a gas component, and it is not limited to the gas containing only $H_2$ as the gas component. As the $H_2$ rich gas 50, gas containing CO as well as $H_2$ as the gas component can be used, for example. CO in the $H_2$ rich gas 50 can be converted to $CO_2$ by a reaction with $O_2$ by the combustion catalyst 48.

A production method of the $H_2$ rich gas 50 to be supplied to the combustion removal unit 41 is not particularly limited, and $H_2$ produced by a hydrogen producing device, which uses fossil fuel as a raw material and has a reforming process and a CO shifting process, can be supplied to the combustion removal unit 41 as $H_2$ rich gas. Gas generated by using fossil fuel as a raw material is used as the $H_2$ rich gas 50 and used as combustion gas required for removing $O_2$ in the $CO_2$ gas 16, thereby enabling to efficiently use the gas generated by using fossil fuel as a raw material.

According to the $CO_2$ recovery unit 10B according to the present embodiment, because the combustion removal unit 41 includes the $H_2$ gas supply unit 51 that supplies the $H_2$ rich gas 50 to the combustion removal unit 41, the dehydrating agent 32 and $O_2$ in the $CO_2$ gas 16 can react with the $H_2$ rich gas 50 to facilitate combustion, thereby enabling to remove $O_2$ in the $CO_2$ gas 16 more efficiently. By using the $H_2$ rich gas 50 as combustible gas required for removing $O_2$ in the $CO_2$ gas 16, gas generated by using fossil fuel as a raw material can be efficiently used.

Industrial Applicability

As described above, the $CO_2$ recovery unit according to the present invention is suitable for removing a dehydrating agent mixed in $CO_2$ gas and removing $O_2$ in $CO_2$ gas, at the time of reducing moisture in $CO_2$ gas recovered from a regenerator.

EXPLANATIONS OF LETTERS OR NUMERALS 10A, 10B $CO_2$ recovery unit
11 flue gas
12 $CO_2$ absorbent (absorbent), lean solution
13 $CO_2$ absorber
14 rich solution
15 regenerator
16 $CO_2$ gas
17 flue gas
18 rich solvent pump
19 rich/lean solvent heat exchanger
20 lean solvent pump
21 lean solvent cooler
22 regenerating heater
23 water vapor
25 gas discharge line
26 condenser
27, 46 separation drum
28 water
29-1 to 29-4 first compressor to fourth compressor
30-1 to 30-4 first cooler to fourth cooler 31-1 to 31-4 first separator to fourth separator
32 dehydrating agent
33 dehydrating column
34 gas-liquid separator
35 condensed-water circulation pump
41 combustion removal unit
42 heat exchanger
43 rich-solution supply pipe
44 nozzle
45 chimney tray
47 water vapor/condensed water
48 combustion catalyst
49 branch passage
50 $H_2$ rich gas
51 $H_2$ gas supply unit

The invention claimed is:

1. A $CO_2$ recovery unit including a $CO_2$ absorber that brings flue gas containing $CO_2$ into contact with a $CO_2$ absorbent and removes $CO_2$ in the flue gas, and a regenerator that diffuses $CO_2$ in a rich solution having absorbed $CO_2$ in the $CO_2$ absorber, to reuse in the $CO_2$ absorber a lean solution which is obtained by removing $CO_2$ from the rich solution in the regenerator, comprising:
at least two compressors that compress $CO_2$ gas discharged from the regenerator;
a dehydrating column that is provided between any two of the compressors and reduces moisture in the $CO_2$ gas by bringing the $CO_2$ gas into contact with a dehydrating agent;
a combustion removal unit that removes the dehydrating agent mixed in with $CO_2$ gas in the dehydrating column; and
a heat exchanger that is provided between the dehydrating column and the combustion removal unit and performs heat exchange between $CO_2$ gas discharged from any one of the compressors and $CO_2$ gas discharged from the dehydrating column.

2. The $CO_2$ recovery unit according to claim 1, wherein the combustion removal unit is provided between the dehydrating column and a gas-liquid separator provided on a downstream side of the dehydrating column.

3. The $CO_2$ recovery unit according to claim 1, wherein the combustion removal unit includes a combustion catalyst for removing a dehydrating agent in the $CO_2$ gas.

4. The $CO_2$ recovery unit according to claim 3, wherein the combustion catalyst is a Pd metal catalyst or a Pt metal catalyst.

5. The $CO_2$ recovery unit according to claim 1, comprising a branch passage for extracting $CO_2$ gas discharged from the combustion removal unit and merging the $CO_2$ gas with $CO_2$ gas discharged from the dehydrating column.

6. The $CO_2$ recovery unit according to claim 1, comprising a hydrogen-gas supply unit that supplies hydrogen rich gas into the combustion removal unit.

7. The $CO_2$ recovery unit according to claim 6, wherein the hydrogen rich gas is hydrogen produced by a hydrogen producing device, which uses fossil fuel as a raw material and has a reforming process and a CO shifting process.

8. The $CO_2$ recovery unit according to claim 6, wherein the hydrogen rich gas contains CO as well as hydrogen.

9. A $CO_2$ recovery method of using the $CO_2$ recovery unit according to claim 1, wherein in a process of compressing the $CO_2$ gas recovered from the regenerator, after moisture in the $CO_2$ gas is reduced by bringing the $CO_2$ gas into contact with the dehydrating agent, $CO_2$ gas after removal of moisture is heat-exchanged with $CO_2$ gas discharged from any one of compressors, and the dehydrating agent mixed in the $CO_2$ gas is removed by combustion and $O_2$ is removed, to recover $CO_2$ gas.

10. A $CO_2$ recovery unit including a $CO_2$ absorber that brings flue gas containing $CO_2$ into contact with a $CO_2$ absorbent and removes $CO_2$ in the flue gas, and a regenerator that diffuses $CO_2$ in a rich solution having absorbed $CO_2$ in the $CO_2$ absorber, to reuse in the $CO_2$ absorber a lean solution which is obtained by removing $CO_2$ from the rich solution in the regenerator, comprising:
at least two compressors that compress $CO_2$ gas discharged from the regenerator;
a dehydrating column that is provided between any two of the compressors and reduces moisture in the $CO_2$ gas by bringing the $CO_2$ gas into contact with a dehydrating agent;
a combustion removal unit that removes the dehydrating agent mixed in with $CO_2$ gas in the dehydrating column; and
a heat exchanger that is provided in the combustion removal unit and performs heat exchange between $CO_2$ gas discharged from any one of the compressors and $CO_2$ gas discharged from the dehydrating column.

11. The $CO_2$ recovery unit according to claim 10, wherein the combustion removal unit includes a combustion catalyst for removing a dehydrating agent in the $CO_2$ gas, in which the heat exchanger and the combustion catalyst are arranged in this order from an inlet side of $CO_2$ gas into the combustion removal unit toward an outlet side thereof.

12. A $CO_2$ recovery method in which flue gas containing $CO_2$ is brought into contact with a $CO_2$ absorbent in a $CO_2$ absorber to remove $CO_2$ in the flue gas, $CO_2$ in a rich solution having absorbed $CO_2$ is removed in a regenerator, and a regenerated lean solution is reused in the $CO_2$ absorber, and $CO_2$ gas discharged from the regenerator is recovered, comprising:
compressing the $CO_2$ gas recovered from the regenerator by using at least two compressors;
reducing moisture in the $CO_2$ gas by bringing the $CO_2$ gas into contact with a dehydrating agent between any two of the compressors;
heat-exchanging $CO_2$ gas brought into contact with the dehydrating agent with $CO_2$ gas discharged from any one of the compressors; and
removing the dehydrating agent mixed in the $CO_2$ gas by combustion and removing $0_2$ to recover $CO_2$ gas.

13. The $CO_2$ recovery method according to claim 12, further comprising:
separating moisture in the $CO_2$ gas after removing the dehydrating agent.

14. The $CO_2$ recovery method according to claim 12, wherein hydrogen rich gas is supplied at a time of combusting and removing the dehydrating agent mixed in the $CO_2$ gas.

15. The $CO_2$ recovery method according to claim 14, wherein hydrogen produced by a hydrogen producing device, which uses fossil fuel as a raw material and has a reforming process and a CO shifting process, is used as the hydrogen rich gas.

16. The $CO_2$ recovery method according to claim 14, wherein a gas containing CO as well as hydrogen is used as the hydrogen rich gas.

* * * * *